Dec. 20, 1927.

W. HOLT

ROD PULLING DEVICE

Filed July 15, 1926

Witnesses:
C. E. Wessels

Inventor:
William Holt,
By Joshua R. H. Potts
his Attorney.

Dec. 20, 1927.
W. HOLT
1,653,046
ROD PULLING DEVICE
Filed July 15, 1926     2 Sheets-Sheet 2
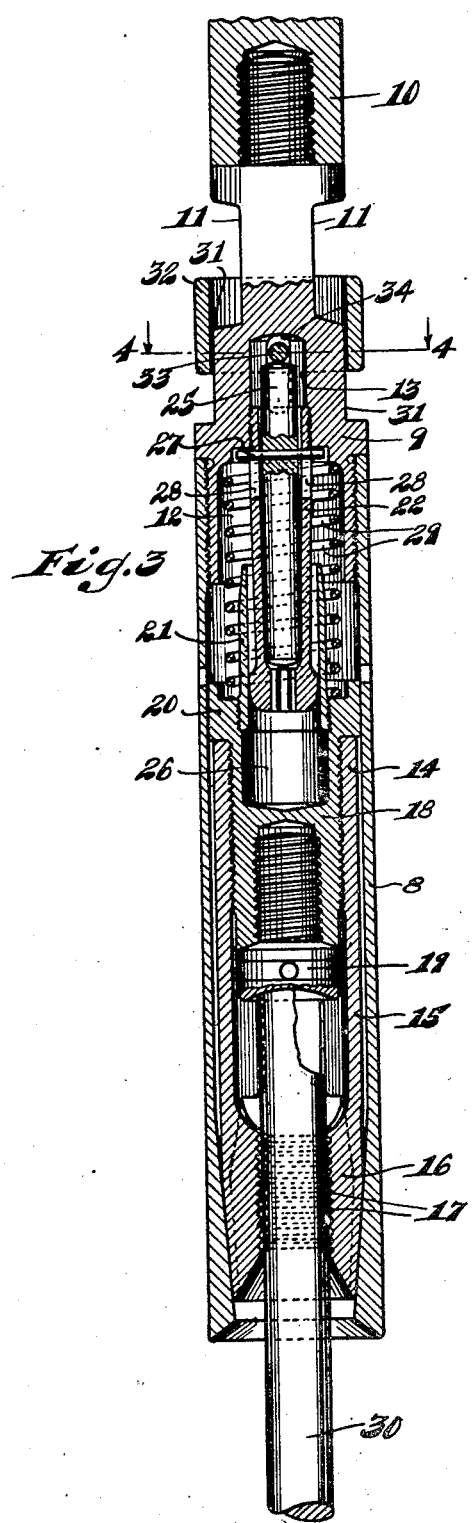
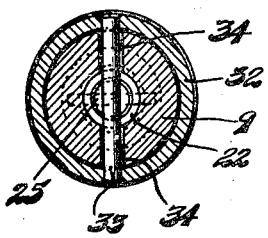
Fig. 4
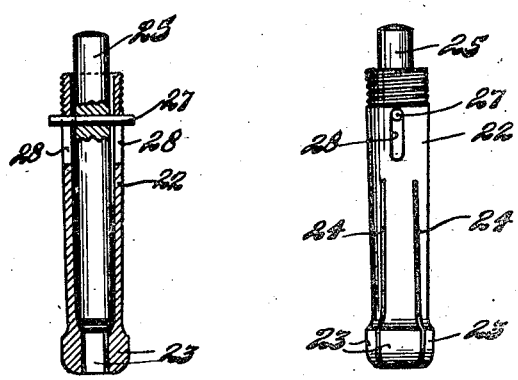
Fig. 6    Fig. 5
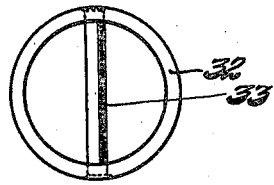
Fig. 7
Witnesses:
Inventor:
William Holt,
By Joshua R. H. Roth
his Attorney.

Patented Dec. 20, 1927.

1,653,046

UNITED STATES PATENT OFFICE.

WILLIAM HOLT, OF ELDORADO, KANSAS, ASSIGNOR TO PETER GUSTAF LEONARD, OF WEST TULSA, OKLAHOMA.

ROD-PULLING DEVICE.

Application filed July 15, 1926. Serial No. 122,621.

My invention relates to a rod pulling device, and the same has for its general object to provide an improved construction of means whereby to recover rods and tools from oil wells.

One of the principal objects of the present invention is the provision of a rod pulling device in which the locking means for holding the sucker-rod gripping means in elevated or set position cannot be released or set off because of the jolt or jar resulting from the engagement of the descending pulling device with the fluid or mud in the tubing of the oil well; and to this end the locking means involved in the present invention is so constructed and mounted and is so arranged with relation to the sucker-rod gripping means that when dropping a string of rod carrying the rod pulling device, the locking means therein can be released or set off only through the engagement of the gripping means with the sucker-rod or tool to be recovered.

Other objects will appear hereinafter.

The invention consists in the combinations and arrangements of parts hereinafter described and claimed.

The invention will be best understood by reference to the accompanying drawings forming a part of this specification, and in which, Fig. 1 represents an elevational view of the exterior of a rod pulling device made in accordance with the present invention;

Fig. 3 is a similar longitudinal section, but showing the locking means set off or released with the various parts in the relative positions they occupy when the sucker-rod is being withdrawn from the well;

Fig. 4 represents a cross section taken on the line 4—4 of Fig. 3;

Fig. 5 represents a detail of the supporting cylindrical body and socket-head;

Fig. 6 is a longitudinal section through the supporting cylindrical body and socket-head; and, Fig. 7 is a detail view in plan of the collar means employed in setting the locking means.

Figure 1:
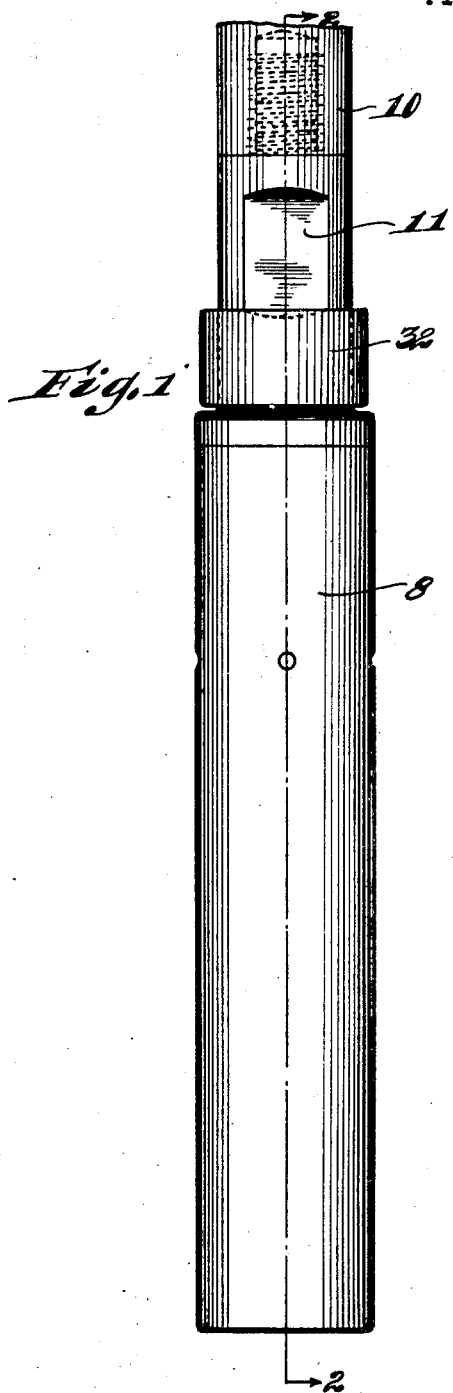

With more particular reference to the parts shown in the accompanying drawings, 8 designates an outer housing of cylindrical form and 9 designates attaching means which is threaded or removably mounted at the upper end of the outer housing 8. The top of the attaching means 9 is threaded for attachment to a lifting or operating element 10. The attaching means 9 is provided with suitable flat sides 11 for engagement by suitable tools. Extending upwardly into the body of the attaching means from its lower end is a chamber 12 and proceeding further into the body of the attaching means from the top end of the chamber 12 is a bore 13.

The sucker-rod gripping means comprises a collar 14 with similar gripping elements or shanks 15 formed at their lower ends with gripping jaws 16 provided with inside teeth 17 for engaging and biting into the sucker rod to be recovered from the well. The collar 14 is threaded upon or attached to an intermediate body 18 into the lower end of which is threaded an adjusting screw 19 which occupies a position between the shanks 15. The parts so far described are old in the art, the same being disclosed in Letters Patent of the United States, No. 1,594,622 issued to Peter Gustaf Leonard, August 3, 1926; and these parts are only shown herein in order that the utility of my improvements and the cooperation thereof with the old parts, may be readily understood.

In the drawings, wherein I have illustrated by way of example the preferred embodiment of my present invention, the intermediate body 18 is provided with a collar 20 at its top end, which collar is threaded or otherwise suitably attached to a carrying sleeve 21. Telescoping within this sleeve is a supporting cylindrical body 22 threaded at its top end within the bore 13 to the attaching means 9. This supporting cylindrical body 22 is formed at its lower end with a socket-head 23 and it is split longitudinally as at 24 in order that the socket-head may be collapsed and telescoped by the carrying sleeve 21. Slidably fitting within the supporting cylindrical body 22 is a locking pin 25 which is designed to have its lower end thrust inside the socket-head 23 to prevent said socket-head from collapsing so that the carrying sleeve 21 may be supported thereon when the parts are in the relative positions shown in Fig. 2, when the pulling device is to be dropped into the oil well for fishing for the sucker rod or tool to be recovered. For the accommodation of the socket-head 23 a suitable chamber 26 is provided in the intermediate body 18.

Fixed to the locking pin 25 is a transverse pin 27 which is taken through a lost motion slot 28 provided for the purpose in the supporting cylindrical body 22 and this transverse pin 27 is fixed to the locking pin 25 at such position that when the lower end of the locking pin is engaged inside the socket-head 23, the upper end of the carrying sleeve 21 will come below it, so that upon upward movement of the carrying sleeve, the locking pin will be withdrawn from the socket-head. Surrounding the supporting cylindrical body 22 and the carrying sleeve 21 and imprisoned between the attaching means 9 and the collar 20 is a strong coiled spring 29 which tends to separate the attaching means 9 from the carrying sleeve 21 and parts subjoined thereto.

Figure 2:
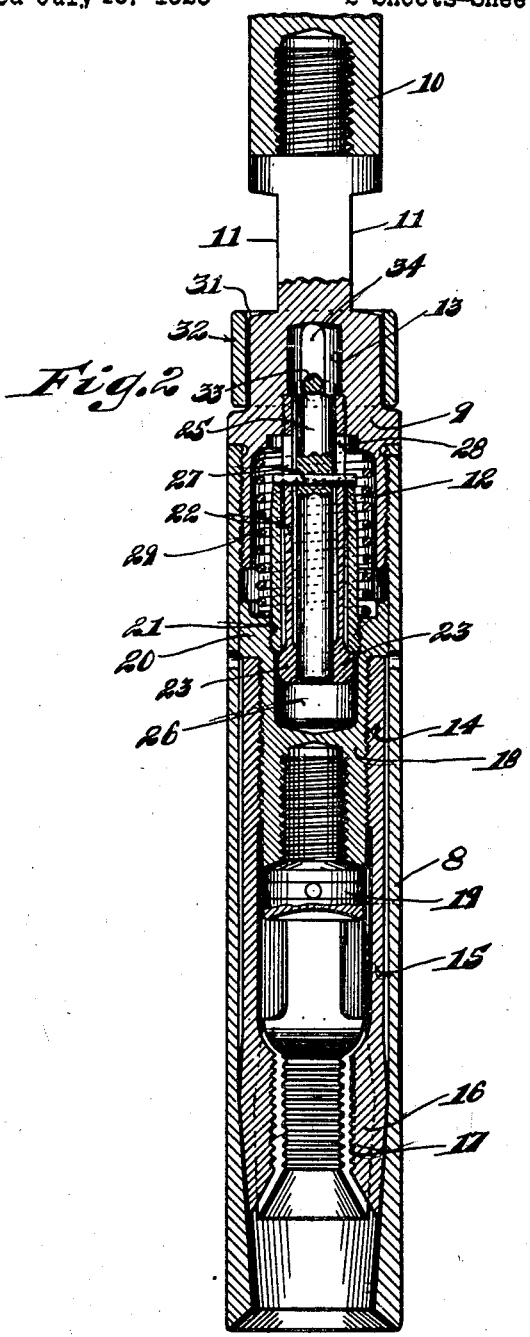
Fig. 2 is a longitudinal section taken on the line 2—2 of Fig. 1 showing the locking means set or locked with the various parts in the relative positions they occupy when fishing for the sucker-rod to be recovered.

When the rod pulling device is to be dropped into the well, the various parts are in the relative positions shown in Fig. 2, with the carrying sleeve and parts subjoined thereto supported upon the socket-head 23 which is held against collapsing by the locking pin 25. Now, upon the engagement of a sucker rod as 30 with the adjusting screw 19, the attaching means 9 and the intermediate body 18 are moved toward each other, the spring 29 being compressed and the carrying sleeve 21, which moves with the intermediate body, serving as the means for effecting the withdrawal of the locking pin from the socket-head. Following this action, and upon the upward movement of the pulling device, the intermediate body parts subjoined thereto moving downwardly within the casing, causes the carrying sleeve to collapse and telescope the socket-head, so that the parts will occupy the relative positions shown in Fig. 3.

Under the construction and arrangement herein shown, it will be observed that it requires the engagement of the sucker rod 30 with the adjusting or contact screw 19 and the weight of the attaching means 9 (with the column or chain of rods thereabove) to compress the spiral spring 29 sufficiently to effect the withdrawal of the locking pin from the socket-head, and that the jolt or jar occasioned by the engagement of the parts of the pulling device with the fluid or mud within the tubing of the well, will not be sufficient to effect the release of the locking means.

In order to remove the sucker rod from the gripping jaws 16, it is necessary to so exert pressure upon the sucker rod and upon the attaching means 9 that the carrying sleeve 21 will advance toward the attaching means 9 so as to release the socket-head for its expansion at the lower end of the carrying sleeve; and in order to project the locking pin into the expanded socket-head, I provide upon a cylindrical portion 31 of the attaching means 9 a slidable collar 32 in which is fixed a pin 33 in position to engage the top end of the locking pin, there being suitable elongated slots 34 provided in the attaching means 9 for the operation of the pin 33. From what has been said, it will be understood that the collar 32 may be manipulated to interlock the locking pin with the socket-head at the time the parts of the device are moved together for the release of the sucker-rod.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. A rod pulling device including carrying means having rod gripping means; collapsible means arranged to support said carrying means; and locking means associated with said collapsible means, substantially as described.

2. A rod pulling device including sleeve means movably mounted and carrying rod gripping means; a body with a circumferentially adjustable socket-head arranged to support said carrying sleeve; and locking means engaging said socket-head and movably mounted to permit circumferential adjustment of the same for the release of said carrying sleeve, substantially as described.

3. A rod pulling device including sleeve means movably mounted and carrying rod gripping means; a body with a circumferentially adjustable socket-head arranged to support said carrying sleeve; locking means engaging said socket-head and movably mounted to permit circumferential adjustment of the same, and means controlled by the movement of said carrying sleeve controlling the operation of said locking means, substantially as described.

4. A rod pulling device including sleeve means movably mounted and carrying rod gripping means; resilient means arranged to urge the movement of said carrying sleeve; a body with a circumferentially adjustable socket-head arranged to support said carrying sleeve; and locking means engaging said socket-head and movably mounted to permit circumferential adjustment of the same for the release of said carrying sleeve under the urge of the resilient means, substantially as described.

5. A rod pulling device including sleeve means movably mounted and carrying rod gripping means; a cylindrical body slidably fitting inside said sleeve and having a socket-head for supporting said sleeve; a locking pin slidably arranged in said cylindrical body and engaging inside said socket-head; and means controlled by the movement of said sleeve controlling the withdrawal of said locking pin from said socket-head, substantially as described.

6. A rod pulling device including a movably mounted carrying sleeve having rod gripping means; a body with a collapsible socket-head cooperating with said sleeve; a movable locking pin engaging said socket-head and holding it spread for the support thereon of said sleeve; and means for withdrawing said pin from said socket-head substantially as described.

7. A rod pulling device including a movably mounted carrying sleeve having rod gripping means; a supporting body extending through said sleeve and having a socket-head protruding over the lower end thereof; a locking pin loosely fitting within said supporting body and extending inside said socket-head; a member projecting from said locking pin and engaging against the upper end of said sleeve; and spring means arranged to urge said sleeve to telescope said socket-head, substantially as described.

8. A rod pulling device including a movably mounted carrying sleeve having rod gripping means; a supporting body extending downwardly through said sleeve and having a socket-head adapted to protrude over the lower end of said sleeve; a locking pin slidably arranged on said supporting body; and means for moving said locking pin to thrust the lower end thereof inside said socket-head, substantially as described.

9. In combination, a tubular casing; a sleeve movable therein and carrying rod gripping means, a supporting body pendant inside the casing, extending through said sleeve and having a socket-head adapted to protrude over the lower end of said sleeve; a locking pin slidable in said supporting body; and collar means on the casing carrying a pin workable in a slot in the casing to engage said locking pin to thrust the lower end thereof inside said socket-head, substantially as described.

10. In a rod pulling device, the combination with a supporting body telescoping within a carrying sleeve and means tending to separate said elements, of a yieldable socket-head on the lower end of the supporting body engaging over the corresponding end of the sleeve; and a movable locking pin entering said socket-head, substantially as described.

11. In a rod pulling device, the combination with a supporting body telescoping within a carrying sleeve and means tending to separate said elements, of a yieldable socket-head on the lower end of the supporting body engaging over the lower end of the sleeve; a movable locking pin within the supporting body entering said socket-head; and a member rigid with said locking pin taken through said supporting body and engaging against the upper end of said sleeve, substantially as described.

12. In a rod pulling device, the combination with a casing having a chamber therein and a cylindrical supporting body depending within said chamber, of carrying means sleeved upon said supporting body; a socket-head on said supporting body engaging the lower end of the carrying means; a spring within said chamber urging the carrying means to telescope said socket-head; a locking pin slidably arranged in said supporting body; and means on said casing for moving said locking pin to enter the end thereof in said socket-head, substantially as described.

In testimony whereof I have signed my name to this specification.

WILLIAM HOLT.